United States Patent
Sarkar

(10) Patent No.: US 9,900,168 B2
(45) Date of Patent: Feb. 20, 2018

(54) SYSTEM AND METHOD FOR RELIABLE MULTICAST DATA TRANSPORT

(71) Applicant: Dipankar Sarkar, Saratoga, CA (US)

(72) Inventor: Dipankar Sarkar, Saratoga, CA (US)

( * ) Notice: Subject to any disclaimer, the term of this patent is extended or adjusted under 35 U.S.C. 154(b) by 58 days.

(21) Appl. No.: 14/613,067

(22) Filed: Feb. 3, 2015

(65) Prior Publication Data
US 2015/0222444 A1   Aug. 6, 2015

Related U.S. Application Data

(60) Provisional application No. 61/935,784, filed on Feb. 4, 2014.

(51) Int. Cl.
  *H04L 12/18*   (2006.01)
  *H04L 29/06*   (2006.01)

(52) U.S. Cl.
  CPC .......... *H04L 12/1877* (2013.01); *H04L 12/18* (2013.01); *H04L 65/4076* (2013.01)

(58) Field of Classification Search
  None
  See application file for complete search history.

(56) References Cited

U.S. PATENT DOCUMENTS

| | | | | |
|---|---|---|---|---|
| 5,600,795 A | * | 2/1997 | Du | H04L 12/427 370/397 |
| 5,745,699 A | * | 4/1998 | Lynn | G06F 12/0669 709/217 |
| 5,757,653 A | * | 5/1998 | Christian | G06F 17/509 716/112 |
| 5,930,233 A | * | 7/1999 | Kanerva | H04L 47/10 370/231 |
| 6,278,716 B1 | * | 8/2001 | Rubenstein | H04L 1/1819 370/394 |
| 6,549,513 B1 | * | 4/2003 | Chao | H04L 45/00 370/227 |
| 6,775,246 B1 | * | 8/2004 | Kuribayashi | H04H 60/04 370/257 |
| 7,054,902 B2 | * | 5/2006 | Toporek | H04L 12/18 709/203 |
| 7,590,703 B2 | * | 9/2009 | Cashman | H04N 21/4126 455/3.04 |
| 7,791,419 B1 | * | 9/2010 | Lemkin | H03L 1/027 331/154 |
| 8,214,707 B2 | * | 7/2012 | Munson | H04L 1/0002 370/394 |

(Continued)

*Primary Examiner* — Bunjob Jaroenchonwanit

(57) ABSTRACT

A system and method of providing a reliable and efficient multicast data transfer mechanism in a communication network. The mechanism includes a plurality of computer nodes and one or more data system managers wherein each of computer nodes and each of data system managers are connected through the said communication network. The method generally comprises the steps of setting up of an association among one or more computer nodes as senders and one or more computer nodes as receivers using a combination of unicast and multicast protocols and transmitting one or more packets of data through the said multicast protocol by one or more senders to one or more receivers. The receivers may collaborate among themselves to ensure delivery of said one or more packets of data reliably to the collaborating receivers.

26 Claims, 12 Drawing Sheets

(56) References Cited

U.S. PATENT DOCUMENTS

| | | | | |
|---|---|---|---|---|
| 8,379,083 B1* | 2/2013 | Jafari | .................... | H04N 7/185 |
| | | | | 348/125 |
| 9,049,259 B2* | 6/2015 | Rathod | ............ | H04N 21/44222 |
| 2005/0157742 A1* | 7/2005 | Chen | .................. | H04L 12/1877 |
| | | | | 370/432 |
| 2010/0229244 A1* | 9/2010 | Champion | .......... | H04L 63/0428 |
| | | | | 726/27 |
| 2011/0134797 A1* | 6/2011 | Banks | ................ | H04W 40/246 |
| | | | | 370/254 |
| 2012/0275457 A1* | 11/2012 | Bijwaard | .............. | H04L 12/185 |
| | | | | 370/390 |
| 2015/0043428 A1* | 2/2015 | Erdmann | ................ | H04L 45/54 |
| | | | | 370/328 |
| 2015/0295692 A1* | 10/2015 | Gowda | ................ | H04L 5/0055 |
| | | | | 370/336 |
| 2016/0150256 A1* | 5/2016 | Van Zijst | ............. | H04L 47/125 |
| | | | | 725/116 |
| 2016/0234351 A1* | 8/2016 | Dajani | ................... | H04L 69/16 |

* cited by examiner

SYSTEM AND METHOD FOR RELIABLE MULTICAST DATA TRANSPORT

CROSS-REFERENCE TO RELATED APPLICATIONS

This application claims the benefit of U.S. Provisional Application No. 61/935,784, entitled "Multicast Replication Transport for Distributed Block Storage", inventor Dipankar Sarkar, filed Feb. 4, 2014; this application also a continuation of, and claims the priority benefit of, PCT application PCT/US15/14219, "SYSTEM AND METHOD FOR RELIABLE MULTICAST DATA TRANSPORT", inventor Dipankar Sarkar, filed Feb. 3, 2015; the entire contents of both applications are incorporated herein by reference.

FIELD OF THE INVENTION

The present invention relates to the field of Network connected Data Transfer System. More specifically, the present invention provides a reliable multicast data transport mechanism.

BACKGROUND OF THE INVENTION

Electronic data systems are implemented using software on a variety of hardware components like computers, disk drives, solid state memory and networking switches. Most data systems store their data in block format where, the sequence of bytes are broken into fixed size blocks and stored in the underlying storage media blocks. This is usually the case as the underlying physical storage is organized into blocks. Read and writes happen in chunks of each data block. The blocks may not be laid out in sequence in the storage media but would be logically linked to form each contiguous file or data blob. The last block may be partially filled. These blocks are stored in the media based on some form of block organization. There is an overlaying data management layer that maintains meta information for the files or data blobs and mechanisms to deploy and retrieve the blocks as required. In a network connected distributed storage, the blocks are spread over clusters of computer nodes connected by data networks. For reliability and disaster recovery, clusters can be distributed over many geographic locations. The blocks are distributed and replicated over these clusters based on various policies specified for that installation. Usually, this includes the same block saved in multiple different computer nodes of geographically separated clusters.

The replication is done to create data redundancy and load balancing. The replication is usually designed to serve two purposes. First, the data is made available closer to the processing units. Second, the replication is such that even if a catastrophe were to strike one location, the data would still be preserved in another location. The data management system can then work around the lost data blocks. It would then replicate those blocks on other working clusters.

The replication process needs to be reliable as data integrity and data preservation is of utmost importance. The communication mechanism over the network between the nodes has to be reliable. Currently, block storage mechanisms use unicast streams to replicate data across the various computer nodes that are selected for replication. The mechanism is called pipelining. In this mechanism, when the client wants to write data, it queries the data management system for a list of computer nodes where the data is to be replicated. It receives a list of computer node information where the data would be replicated. This is called the pipeline. The client then opens a point-to-point connection to the first computer node in the list. It passes the list to the next computer node in the pipeline and streams the block data to it. The first computer node then opens a second point-to-point connection to the second computer node and streams the block data to it, and so on it goes. The last block receiving the data sends an acknowledgement. The acknowledgement is then cascaded back to the client through the reverse sequence of computer nodes in the pipeline. Alternatively, the sender can open multiple point-to-point connections and unicast the data over these connections.

There are other kinds of replication like Master-Slave configuration and Multi-Master replication where the same data needs to be transmitted to multiple database servers. Such scenarios can benefit from a fully reliable multicast data transfer.

In a multi-user network based remote conferencing system, some of the data from one participant would need to be transmitted to multiple participants. Such a use case can also benefit from a fully reliable multicast data transfer.

Multicast is a class of communication where one entity sends the same data to multiple entities in a single transmission from itself. The data can be sent with multiple transmissions at points that fork into multiple independent paths. The transmission takes on different forms depending upon the underlying network. There is Internet Protocol multicast, ISO CLNP multicast, Network-on-chip multicast and Ethernet multicast and Infiniband multicast. Multicast datagram is normally an unreliable protocol. Where the requirements are strict reliable, reliable unicast mechanisms are used like TCP, TP4 etc. Multicast is used for distributing real time video where it needs to scale with the number of receivers. Limited loss of data show up as glitches and the communication moves on.

Where data needs to be transmitted from one source to multiple receivers, use of multicast transmission is an obvious idea. The validity and viability of a solution based on multicast transmission depends upon the speed, reliability and scalability with error and loss recovery. Reliability using multicast is a domain specific problem. There is no one-solution-fits-all available. Different situations have different types of reliability requirements. Real time audio and video delivery requires sequenced delivery but small amounts of lost data is less important. Small segments of lost data will cause only a slight jitter in the audio or video. In cache updates, time synchronization is more important as validity of cache is important for quick changing data. In data replication, sanctity of the data is more important than speed.

The reliability conditions over wide area networks are different than over local networks. If any of the multicast paths traverse over a wide area network, the issue becomes very important. Over a wide area network, the possibility of packet fragmentation increases. At higher data rates, the possibility of data misalignment during reassembly increases. The number of fragmented packets that can be present in the network at any instance of time is limited by the size of the packet identifier and the data rate. This is described in RFC4963. For IPv4 the packet identifier field is 16 bits. This allows only 64K packets of any protocol between two IP address pairs during a maximum per maximum packet lifetime. At 1 Gbps rate, it takes less than one second to fill up this count. Layer 4 checksum can be used to detect and discard wrongly reassembled packets. With a checksum field of 16 bits and well distributed data, the failure rate of layer 4 in filtering out bad datagrams is 1 in 64K. It improves with larger size checksum like 32 bit. Some firewalls allow only known protocol types to pass through. So, many multicast applications tend to use User Datagram Protocol (UDP) which has a checksum size of 16 bits. This analysis indicates that for big data kind of usage, direct interfacing with the network layer with a higher size checksum would be a better option.

Multicast has been used in the distributed file systems to transmit the data to the client side caches. JetFile and MCache are examples of this. JetFile is a distributed file system similar to NFS in functionality. It maintains cache of the files at the computer nodes requesting the file. The files are distributed using Scalable Reliable Multicast (SRM) protocol. In the JetFile system, the sender has no knowledge of the receivers. The sender sends the data to the group multicast address. The receivers are clients who serve files as a peer-to-peer network. Multicast is an unreliable delivery mechanism. In the above two cases, if any receiver does not get the data, there would not be any damage. A retry will fetch the data with a slight delay. If data caches do not receive the data, it will only delay the fetching of data, not cause a data loss. The problem of data loss can be somewhat mitigated by using published algorithms like SRM & PGM but not completely solved. In all of these algorithms, the responsibility of getting all the data lies completely with the receivers. If any or all receivers fail to get the complete block of data, the sender will never know. In the case of block replication, that would be a failure of operation. In case of data replication, the sender needs to know of any data loss and take corrective action.

Encrypted UDP based FTP with multicast (UFTP) uses multicast to send files to a group of receivers. In this protocol, the sender breaks the data into a sequence of transmittable blocks. Each block has a sequence number. The blocks are grouped in sections. The sender transmits all the blocks in a section and then waits for the negative acknowledgement (NAK) from the receivers. For every block that it receives a NAK, it retransmits the block. If it does not receive any NAK, it closes the session. Again the problem is, if a NAK is lost or receivers fail to get the data, the sender will not get to know. Also, if the NAKs are sent at the end of a big section transfer, it poses a burden on the sender. The sender needs to preserve all the transmitted packets holding up memory or recreate the lost packet by streaming through the original data. This is good for occasional transfer like end of day updates to remote sites. For high load of simultaneous occurring transfers, this can exhaust system resources.

In Distributed File Systems, like Hadoop Distributed File System, there is a need for bytes constituting a file block to be delivered sequentially and reliably. No existing reliable multicast transport has been able to fulfil that requirement. So, such file systems continue to use multiple reliable unicast point-to-point links using Transmission Control Protocol (TCP) till date.

Accordingly, there exists in the art a need for a method for a reliable multicast data transfer with better error recovery and faster loss recovery mechanisms in network connected data distribution systems.

SUMMARY OF THE INVENTION

The following presents a simplified summary in order to provide a basic understanding of some aspects of the disclosed invention. This summary is not an extensive overview, and it is not intended to identify key/critical elements or to delineate the scope thereof. Its sole purpose is to present some concepts in a simplified form as a prelude to the more detailed description that is presented later.

The present invention provides a more efficient transport by creating a reliable multicast protocol.

One object of the present invention is to provide the existing replication mechanisms of distributed block storage data systems, a faster transport using multicast protocol at the network layer. The network layer can be Internet Protocol multicast, ISO CLNP multicast or Network-on-Chip multicast or any such multicast network.

In this scenario proposed by the present invention, there are one or more senders and multiple receivers. Usually, the receivers are part of the same administrative domain. The receivers can collaborate amongst themselves. So, the unique characteristic of this situation is that the data transfer has to be reliable not to any one receiver or all the receivers but to the aggregate of all the receivers as a whole. This is another object of the present invention.

These as well as other objects of the present invention are apparent upon inspection of this specification, including the drawings and appendices attached hereto.

BRIEF DESCRIPTION OF THE DRAWINGS

In order to describe the manner in which features and other aspects of the present disclosure can be obtained, a more particular description of certain subject matter will be rendered by reference to specific embodiments which are illustrated in the appended drawings. Understanding that these drawings depict only typical embodiments and are not therefore to be considered to be limiting in scope for all embodiments, various embodiments will be described and explained with additional specificity and detail through the use of the accompanying drawings in which.

DETAILED DESCRIPTION OF THE INVENTION

Figure 1:
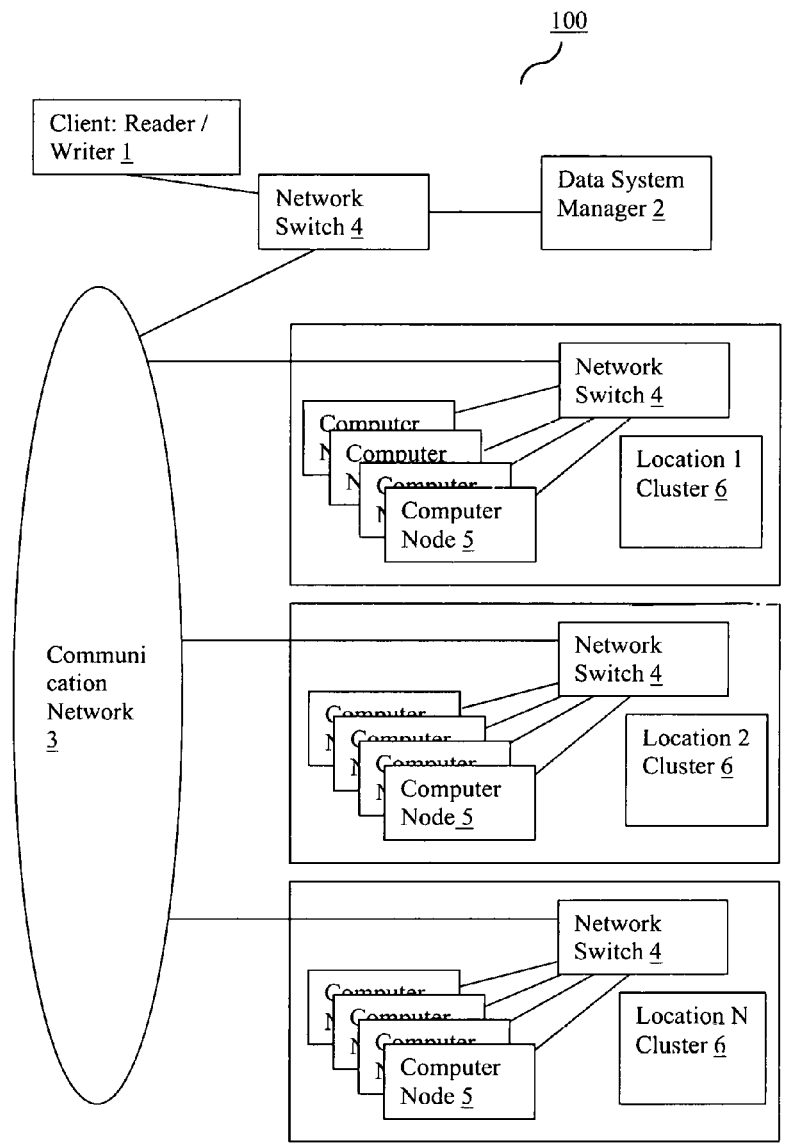
FIG. 1 is an illustration of a prior art network connected distributed data system.

FIG. 1 is an illustration of a network connected distributed data system (100) generally known in the art. The system 100 includes one or more network hosts such as Client (I) and plurality of Clusters (6) each comprising plurality of Computer Nodes (5) located at same or different geographic locations etc. The system 100 also includes one or more Data System Managers (2) running on computers, a communication network (3) and other necessary networking devices such as plurality of Network Switches (4) etc. The Client (1) can be a reader/receiver or writer/transmitter. Client (1) accesses the Data System (100) over the Network (3) via the Application Programmer Interface (API) provided by the Data System Manager (2). There are clusters (6) of computer nodes (5) in various geographic locations. Some of the clusters (6) can be located in the same data center and some in remote locations. The above modules connect to the communication network (3) via the nearest Network Switch (4).

FIG. 1 illustrates just an example of a suitable computing system environment in which the present invention may be implemented. The computing system environment is only one example of a suitable computing environment and is not intended to suggest any limitation as to the scope of use or functionality of the invention. Neither should the computing environment be interpreted as having any dependency requirement relating to any one or combination of components illustrated in the exemplary operating environment.

The present invention is operational in numerous other general purpose or special computing system environments or configurations other than shown in FIG. 1. Examples of well known computing systems, environments, and/or configurations that may be suitable for implementing the invention include, but are not limited to personal computers, server computers, laptop devices, multiprocessor systems, microprocessor-based systems, network PCs, minicomputers, mainframe computers, distributed computing environments that include any of the above systems or the like.

Figure 2:
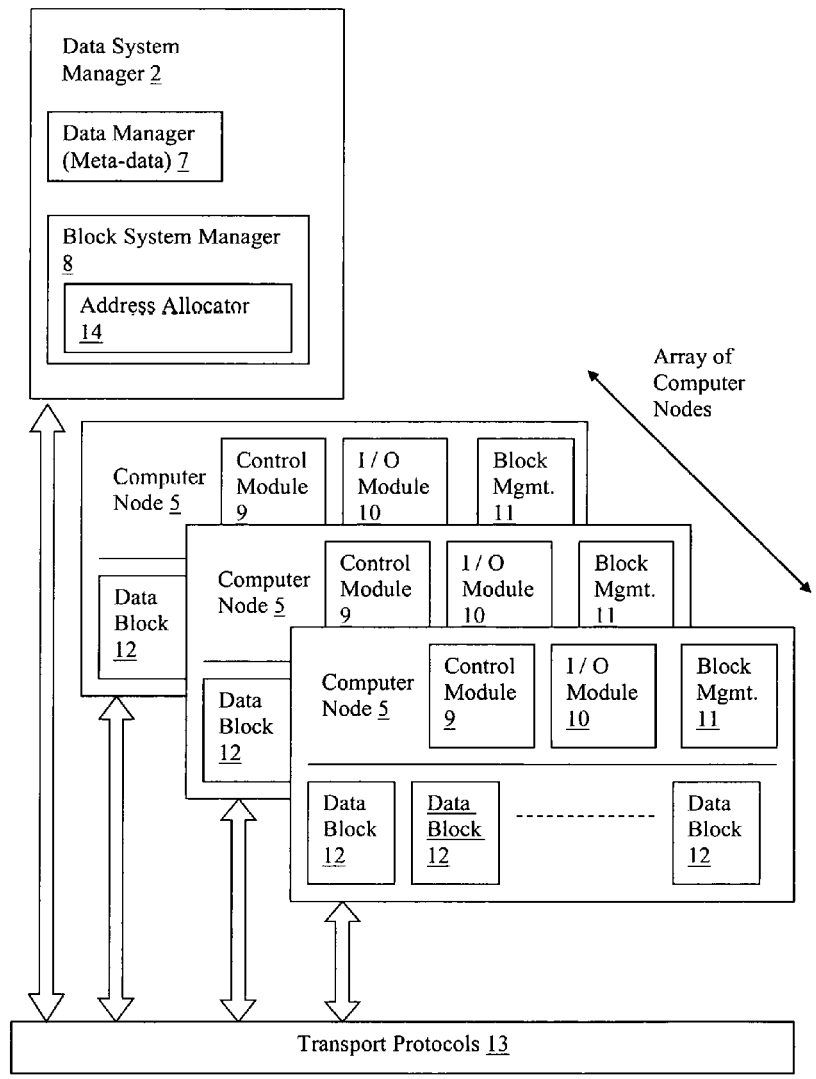
FIG. 2 illustrates the logical modules in a typical setup of a distributed data system in accordance with an embodiment of the present invention.

FIG. 2 illustrates the logical modules of network distributed Data system (100) in a typical setup employing the principles of the present invention implemented through a combination of hardware and software components. The hardware components are programmed to execute one or more instruction for the data transfer mechanism by using the software components proposed by the present invention. The Data System Manager (2) has a module called Data Manager (7) that manages the attributes and meta-data of the files or data blobs. The Block System Manager (8) is responsible for distributing and replicating the data across the blocks. Each Computer Node (5), apart from the standard modules of a computer, has various modules dealing with the block management. Typically, it would have a Control Module (9) responsible for listening to instructions from the central Block System Manager (8) and acting upon them in the computer node. If a new address needs to be listened on for block data, the Control Module (9) instructs the I/O Module (10) to listen and receive data. The Block Management module (11) is responsible for managing the Data Blocks (12) within the Computer Node (5). The I/O Module (10) receives the incoming block data and moves it to the appropriate blocks. All the communication among Client (1), Computer Node (5) and Data System Manager (2) and inter-node communication happen using a set of Transport Protocols (13). This set of Transport Protocol (13) depends upon the type of underlying network. FIG. 2 also illustrates the introduction of an Address Allocator Module (14) in accordance with an embodiment of the present invention. The Address Allocator (14) is responsible for maintaining a list of multicast addresses and if needed, corresponding Transport layer Service Access Point (TSAP).

Figure 3:
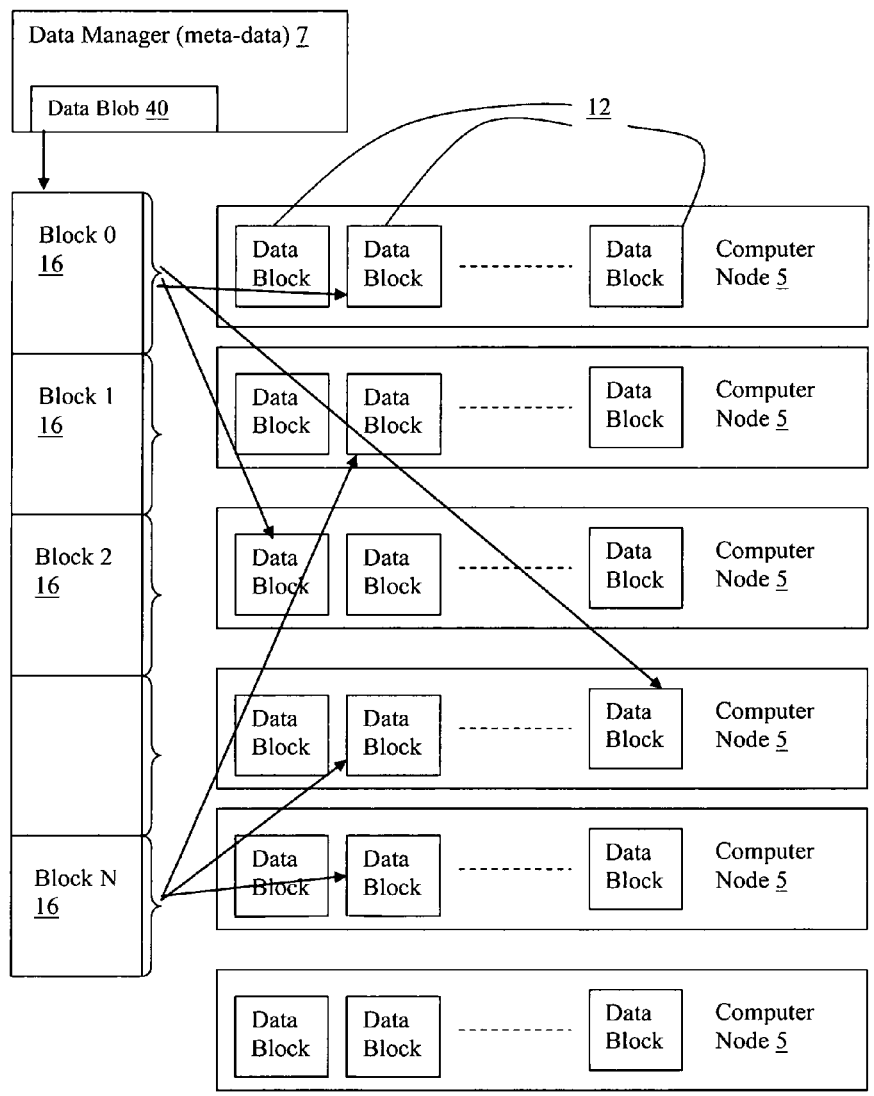
FIG. 3 illustrates an exemplary method for data block distribution among different computer nodes in a distributed data system.
Figure 4:
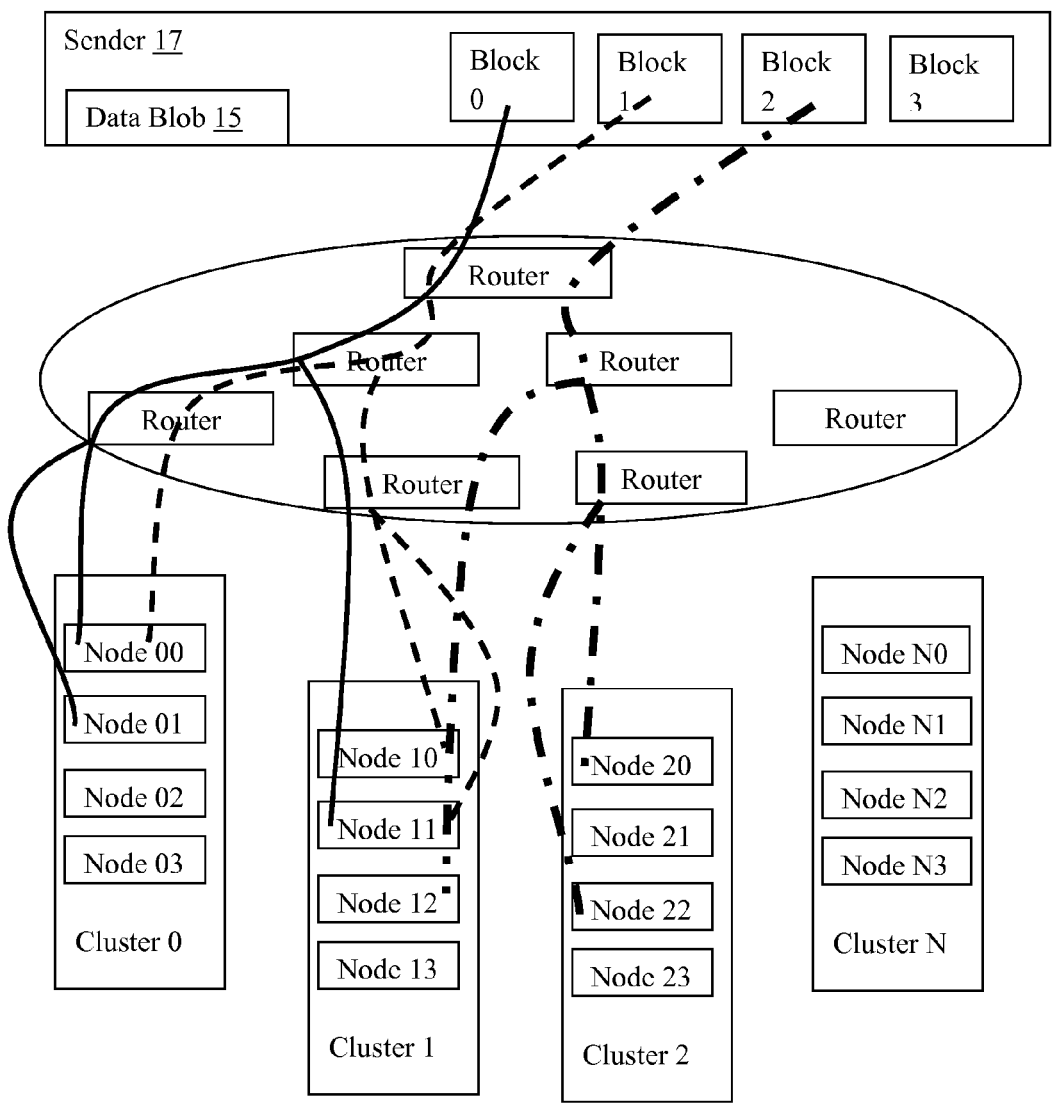
FIG. 4 illustrates multicast data flow paths when the data traverses the network for replication of the blocks in a distributed data system in accordance with an embodiment of the present invention.

FIG. 3 illustrates an example of how the data blocks (16) of a file/data blob (15) are distributed around amongst the computer nodes (5). The Data Manager (7) has, amongst its meta-data, a pointer to its various data blocks (40). These blocks (16) have the pointer to the various locations where the block has been stored. In the example shown in FIG. 3, the replication count is three and so, each of the blocks (16) are copied in three different locations in various Computer Nodes (5). If a Computer Node (5) were to go down, the blocks (12) stored there would get replicated in other Computer Nodes (5).

Figure 6:
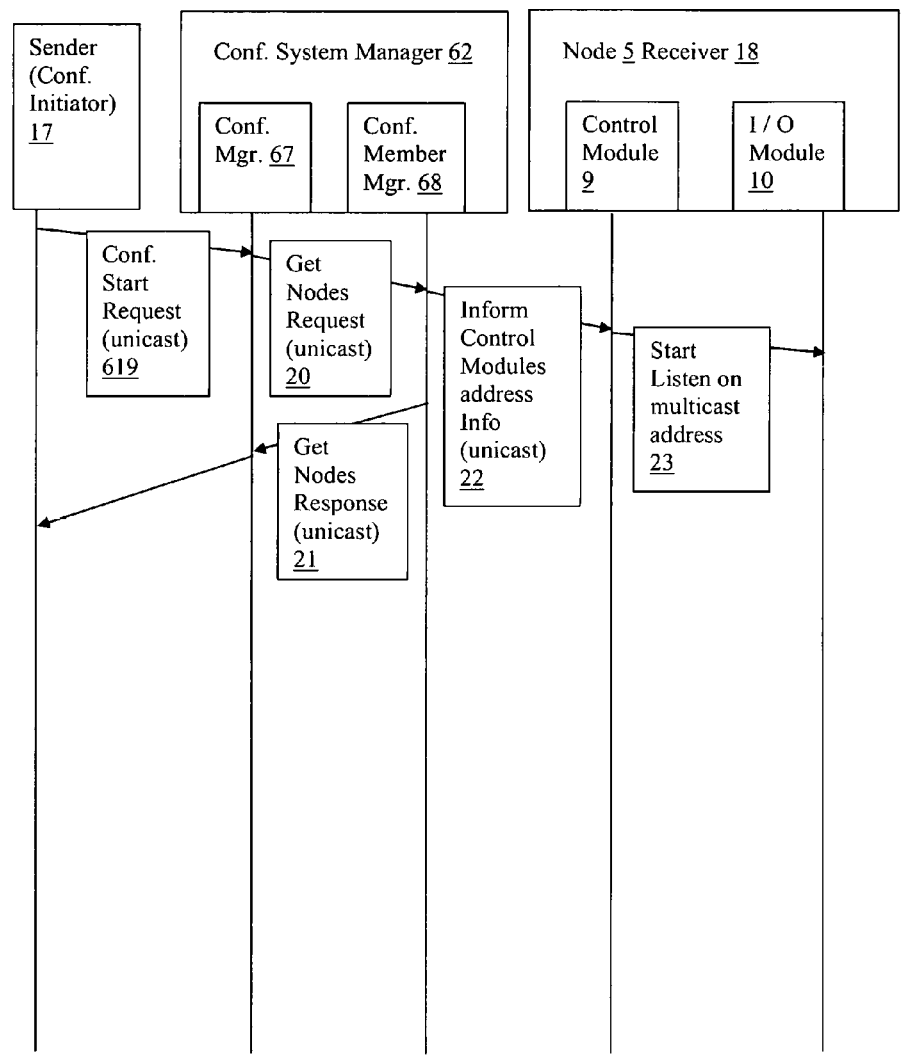
FIG. 6 illustrates an initial scenario of an online conference use case as an exemplary embodiment of usage of the present invention.

The present invention proposes modification to the multicast address allocator modules in the Block System Manager (8) or in its equivalent in other embodiments like Conference Member Manager (68) as shown in FIG. 6 to maintain a cache of the group of computer nodes and the corresponding multicast address. For address allocation to the same group of computer nodes, the recently used multicast address should be re-allocated. Since the network switches and routers already have the routes in their cache, significant efficiencies will be achieved at the network level.

The present invention is different from Scalable Reliable Multicast (SRM), Pragmatic General Multicast (PGM) and Reliable Multicast Transport Protocol (RMTP) in the sense that they are designed to deliver data to all the receiving group members at a high throughput with the best effort reliability. The present invention is designed to deliver all the data reliably to the aggregate of all receiving group members at the best effort throughput. The present invention is different from Encrypted UDP based FTP with multicast (UFTP) and Xpress Transport Protocol in the sense, the UFTP and XTP receivers do not collaborate and so cannot be treated as an aggregate whole.

SRM and UFTP use only negative acknowledgement mechanism. A negative acknowledgement identifies the data that has not been received. There are two ways to identify data. One is to identify a named portion of data. The second one is to use a sequence number. This invention uses a combination of positive acknowledgement (ACK) and negative acknowledgement (NACK) for reliability. The positive acknowledgement helps the sender to recycle the buffers containing the data it knows it has transmitted successfully. The negative acknowledgement helps in filling up the gaps in the data received and avoid unnecessary retransmissions.

In the preferred embodiment, the protocol proposed by the present invention is run directly on top of the layer providing multicast service like Internet Protocol network layer with configured values including but not limited to the protocol number and checksum size. There can be constraints that may lead to running this invention on top of another datagram service like UDP on top of the multicast layer like IP network layer.

The solution offered by the present invention is in the space of Open Systems Interconnection (OSI) Transport layer as defined by ITU-T X.214, ISO 8072. The terminology, such as T-Data request, T-Data response etc., used herein are to be interpreted as per definitions provided for those terms in ITU-T X.214, ISO 8072 and adds to the terminology the following two items:

T-ASSOCIATE: The interaction between the sender and the receivers is not strictly connection oriented but a loosely coupled association. The error recovery and flow control functions depend upon the relationship and association parameters. This kind of relationship is termed T-ASSOCIATE.

T-DISSOCIATE: To get out of the relationship state created by T-ASSOCIATE, the T-DISSOCIATE primitive is used. It does a graceful release of the relationship between the sender and one or more receivers.

Figure 5:
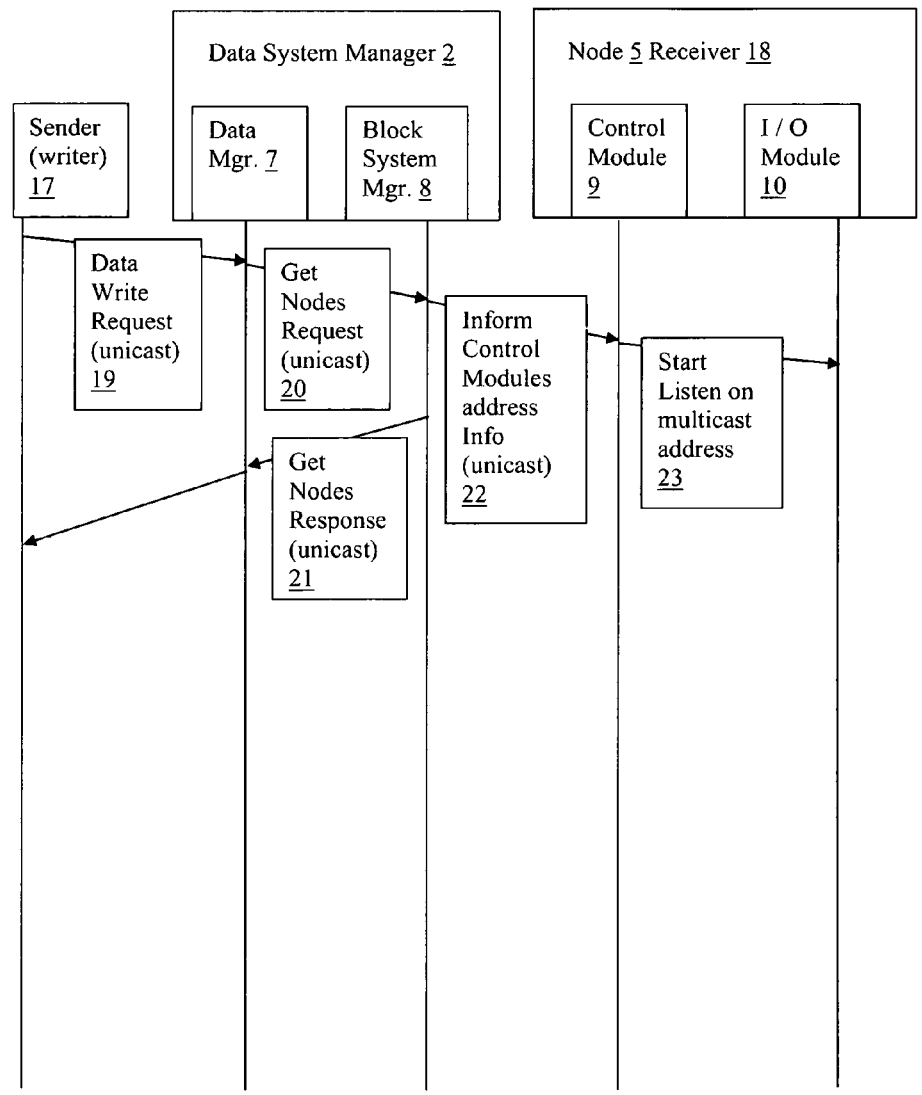
FIG. 5 illustrates an initial scenario of a data replication use case as an exemplary embodiment of usage of the present invention.

FIG. 5 and FIG. 6 illustrate initiation process for reliable multicast data transport as per the present invention in two different exemplary use cases. FIG. 5 shows the initiation process for a distributed data system whereas FIG. 6 shows the initiation process for an online conference system. Reference to FIG. 5, there is a Block System Management Module (8) responsible for block distribution and allocating the multicast address through Address Allocator Module (14) (shown in FIG. 2) for each data transfer association. For the online conference system of FIG. 6, the functions of Block System Manager (8) can be carried out by a Conference Member Manager (68) which is a module included in Conference System Manager (2), Conference System Manager (2) being an equivalent of Data System Manager (2). Depending upon the role it plays, at the different phases of the process described herein, any of the computer nodes (5) or Client (1) can act like a Sender/transmitter (17) or a Receiver (18). In the present examples, hereinafter, Client (1) is referred to as sender (17) as Client (1) is initiating a write operation or an online conference. Reference to FIG. 5 and FIG. 6, when the sender (17) makes an initiation request i.e. data write request (19) or conference start request (619), Data Manager (7) or conference manager (67) transmits Node Request (20) for obtaining node information to the Block System Manager (8) or to the conference member manager (68). The Block System Manager (8) or the conference member manager (68) works out which computer nodes (5) would receive data and the corresponding multicast network address. If the underlying transport is the network layer, the protocol number would be decided at setup time and configured. If the underlying protocol is an OSI transport layer datagram protocol like UDP or TP0, the port number or TSAP needs to be chosen. The responsibility of assigning these for each session falls on an Address Allocator module (14). This Address Allocator module (14) allocates the service parameters making sure they do not infringe on other associations. The Block System Manager (8) or the conference member manager (68) unicasts this provisioning information Node information (21) back to the sender (17) and also sends multicast address information (22) to the Control Modules (9) in the computer nodes (5) hosting the replication blocks (12) of FIG. 3, either directly or through a proxy. If the data transfer needs to be encrypted, the Address Allocator Module (14) also generates one or more encryption key(s) and distributes those with the pipeline information. These provisioning messages i.e. messages (21) and (22) are unicast request-response to prevent leakage and unauthorized distribution. The unicast messages can run on top of a secure client server channel like Transport Layer Security (TLS), Secure Socket Layer (SSL) and HTTPS.

The sender (17) gets a complete list of computer nodes that comprise the replication pipeline through unicast message (21) as shown in FIG. 5 and FIG. 6. In a preferred embodiment, a subset of that replication pipeline can be defined synchronous and remaining asynchronous. The synchronous set comprises computer nodes that need to be updated with guarantee. A failure of that guarantee results in the replication process deemed to be a failure and as a result is aborted.

Reference to FIG. 5 and FIG. 6, when the Receivers (18), which are plurality of Computers Nodes (5) belonging to various Clusters (6), included in the multicast network address information (22) receive the multicast network address and port information (22), they start listening on that address and port (23). The switches and routers get the multicast address subscription information from the network and build the multicast routes.

Figure 7:
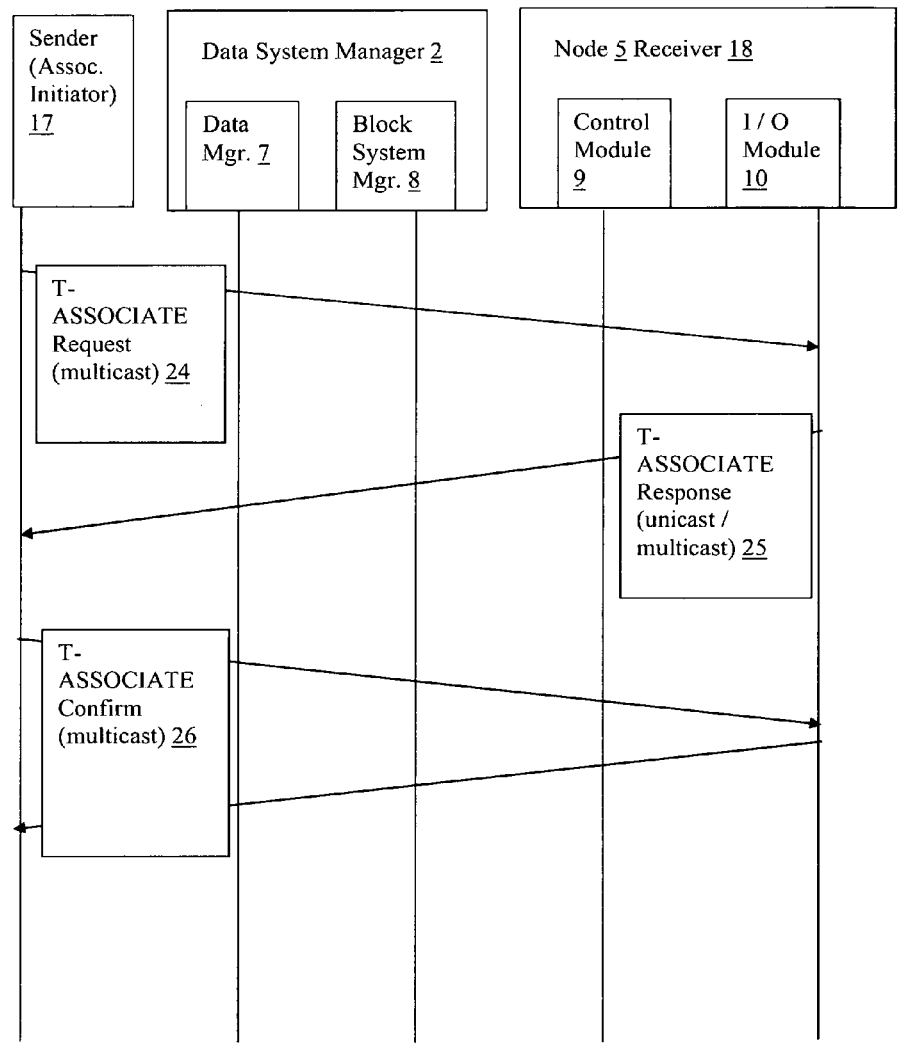
FIG. 7 illustrates an association setup for data transfer between a sender and a data system using a combination of unicast and multicast protocols in accordance with an embodiment of the present invention.
Figure 12:
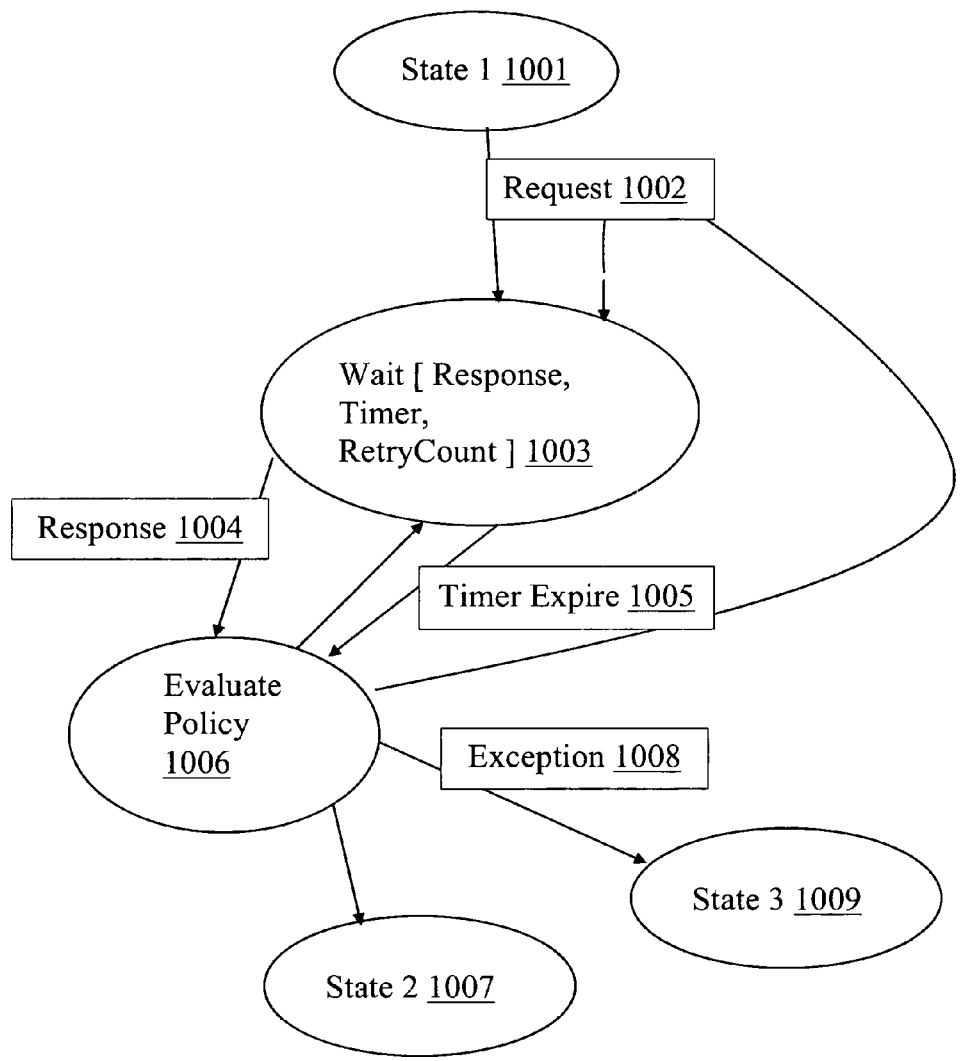
FIG. 12 illustrates the design of a typical fragment of the state machine in accordance with an embodiment of the present invention.

The Sender(s) (17) create(s) a hierarchical state machine corresponding to the transmission session. One of the Senders acts as the initiator of the association. Reference to FIG. 7, the sender (17) sends a T-ASSOCIATE Request message multicast (24) to each of the computer nodes participating in the association. The sender (17) also sends an initial sequence number for the data it will be sending. As shown in FIG. 12, a timer is started after sending the T-ASSOCIATE Request. The timer retries the association process until the association is set up or the retry count is exhausted and an exception is signaled. When the association is set, the timer is cancelled. The receiving computer nodes or Receivers (18) respond with a T-ASSOCIATE Response (25). This can be configured to be unicast or multicast. The receivers of the association request also send an initial sequence number for the data they might be sending. The initiating Sender (17) then sends a T-ASSOCIATE Confirm to the receivers (18). If T-ASSOCIATE Response (25) is unicast, it is the onus of the Sender (17) to propagate the list of receivers to other receivers. It does so with the T-ASSOCIATE Confirm (26) message multicast to all the computer nodes participating in the session. This contains all the participant computer node information and their corresponding initial sequence number. One of the advantages of the receivers (18) knowing about each other is that if any repair needs to be done, it can be done from the nearest receiver. The receivers (18) respond with T_ASSOCIATE Confirm message (26) as an acknowledgement. If any receiving node (5) does not respond within a pre-configured time, the Sender (17) checks the corresponding aggregation policy and the synchronous list. Depending upon that, action might be retries by sending another T-ASSOCIATE Request message (24). After the configured number of retries are over, the sender (17) deals with all the receivers that have succeeded in setting up the association. If this does not include any one of the receivers in the synchronous set or if the aggregation policy so dictates, the sender (17) raises an exception and aborts the transmission. Once the association is established as described through the processes shown in FIG. 7, any of the sender (17) now initiates the data transmission to the receivers (18) that are a part of the association.

The association set up phase is also used to negotiate operational parameters of the association. The sender proposes the parameter values in the T-ASSOCIATE Request call. The receivers respond with the values they want to override in the T-ASSOCIATE Response. The so modified values are then propagated to the receivers using the T_ASSOCIATE Confirm. Amongst the parameters is a type of service parameter that is not negotiable. The type of service parameter can have two values, reliable-sequence-stream and reliable-sequence-packet. Both the settings provide reliable and sequenced delivery. The former accepts and sends the data as a stream to its client layer and the latter accepts and sends the data as finite sized packets.

Figure 8:
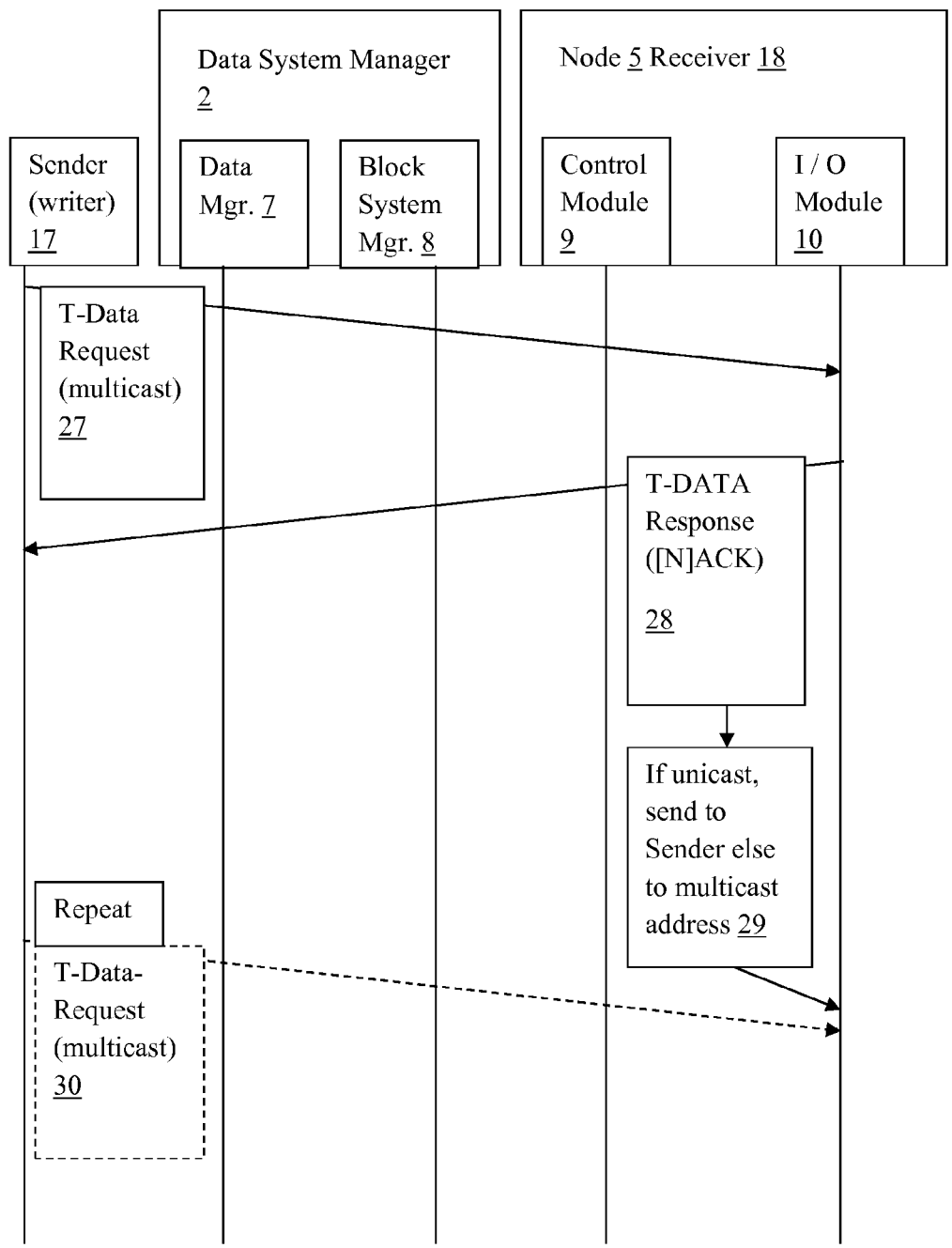
FIG. 8 illustrates a data write process and the data transfer process using multicast protocol to the computer nodes in accordance with an embodiment of the present invention.

Reference to FIG. 8, the Sender (17) uses the T-DATA Request (27) multicast to transfer packets of data to the Receivers (18). It breaks the datagram data (16) to a list of packets with the identifying information, offset, length and the data segment. The size of the packet including the header is maximum transport layer Protocol Data Unit (PDU) size allowed on that interface. This is commonly referred to as the Maximum Transfer Unit (MTU). As shown in FIG. 12, a timer is started after sending the T-DATA Request. The sender (17) then waits on the T-DATA-Response (T-DATA RSP) (28) from the receivers (18). A T-DATA-RSP (28) with the latest sequence number of the data (ACK) is sent by each of the receivers (18) receiving the correct and complete data. A sliding window is defined which is essentially either a count of packets or a count of octets that can be sent without waiting for a T-DATA Response (28). The window is moved forward on state machine corresponding to each receiver from which the T-DATA Response (28) acknowledgements are received. Only when the sender (17) has all the required number of T-DATA Response, does the sender (17) conclude that a particular packet has reached the intended receivers (18). The sequence number is always processed in the context of the Sender. In a scenario, where there are multiple Senders, there are that many sequence number progression at any receiver.

The T-DATA Response (28) can be configured to be sent either to the unicast address of the sender (17) or to the multicast address of this association of sender (17) and receivers (18) as response (29). In other scenarios where multicast is used for the data response, this would cause scalability problems. In this scenario, scalability of T-DATA Response (28 or 29) handling is not an issue as the number of computer nodes involved in a session is a small finite number. If the T-DATA Response (28) is sent to the multicast address as response (29) and any receiver has missed the data packet, it quickly gets to know about the missed packet as soon as it sees the T-DATA Response (29) from other computer nodes. Otherwise if the response is sent unicast, a receiver will get to know about the missing packet only when it sees the gap after it receives the next transmission or the sender times out for the acknowledgement and solicits a data response.

Figure 9:
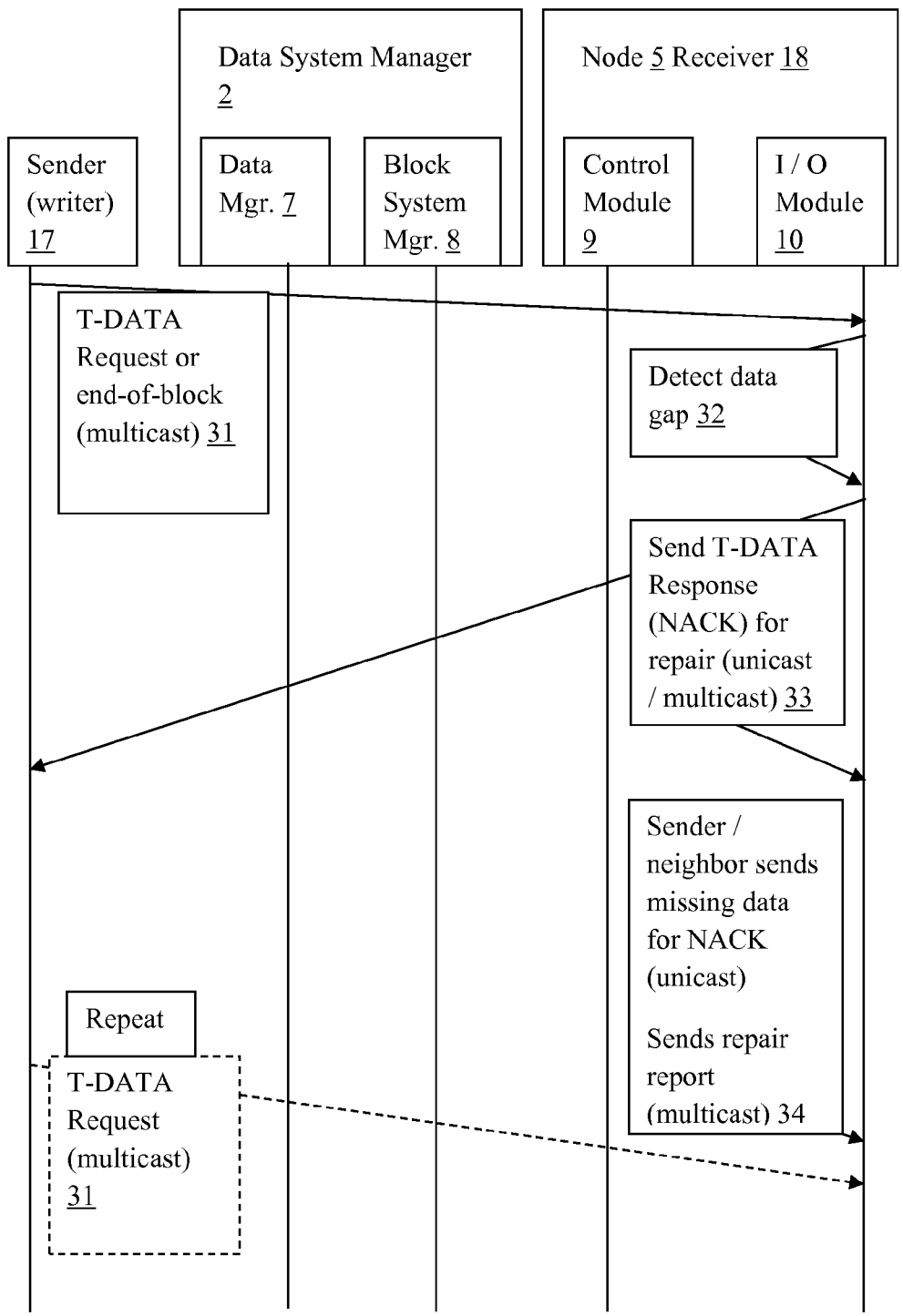
FIG. 9 illustrates a process of error recovery from data loss in accordance with an embodiment of the present invention.

Reference to FIG. 9, if a receiver (18) finds one or more gap (32), on receiving a message i.e. on receiving a Block Packet T-DATA request or end-of-block multicast (31), the receiver (18) adds a negative acknowledgement (NACK) in the T-DATA Response (33) to the Sender (17) if the lower edge of the transmission window from the Sender (17) has not exceeded the beginning of the gap. If the lower edge has moved past that number, the receiver (18) turns to the other receivers for repair request. The receiver (18) multicasts a negative T-DATA-Response (33) to a subnet specific multicast address. Since all the computer nodes involved in the session know about each other, they start a timer to send a repair response. The nearest computer node sends the repair response packet unicast to the receiver wanting it and sends a repair report to the others on the multicast address (34). If the repair report is not seen within the timeout, all the participants restart the timer and the next nearest one sends the repair response and the repair report. This is done till all the retries are exhausted and failure conditions are invoked. The failure handling depends on whether the failing computer node belongs to the synchronous list or not as described above. The above mechanism is good for a scenario where the computer nodes know about their network topology to figure out the distance and cost of transmission. Alternatively, the computer node requesting missing data packets can send the request in an escalating manner. It first sends it to a subnet limited multicast address. If that does not solicit a response, it sends to the regular multicast address but with a Time-To-Live (TTL) network field set to a small value and then increasing the value to escalate the request to computer nodes many hops away. The highest level of escalation will be when it requests the Sender (17) to send the repair packets. The escalation level can be set in the options field of the header.

After all the data is successfully transmitted, the Sender sends a T-DATA Request with no data to indicate a temporary end of data. A T-DATA Request with no data is also sent to solicit acknowledgement for the previously sent data. The rest of the handling happens as before.

For flow control, the T-DATA Request packets go through a transmission window control. The other packets are not subject to that control. The window control constitutes an upper bound of octets that can be transmitted without waiting for an acknowledgement via T-DATA Response packet. The T-DATA Response packet can contain information about missing data segments. It can also contain a receive window size that can further restrict the overall window size as determined by load on the receiver.

In general, to handle lost or missed packets, the packets are retransmitted (30) of FIG. 8 or (31) of FIG. 9 whenever the gap is reported. The retransmission scenarios are attached to timers that are invoked when a packet is transmitted. The receivers can identify the retransmitted data from the sequence numbers that it has already received. It then drops the data if it already has it. Some of the deserving cases are explicitly described in the above sections.

Figure 10:
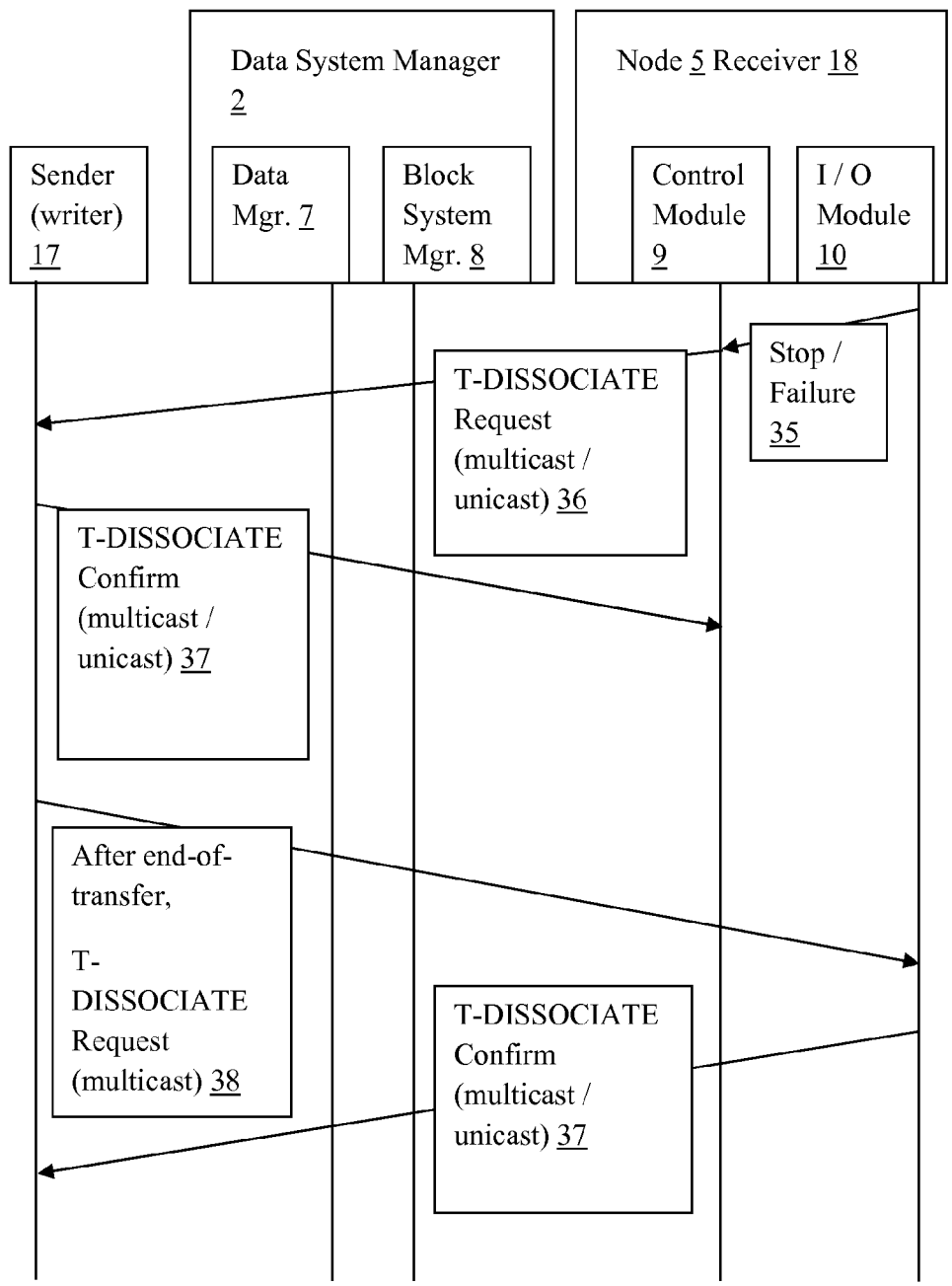
FIG. 10 illustrates a process of tear down of the association set up for a data transfer in accordance with an embodiment of the present invention.

Reference to FIG. 10, if a receiver is to be shutdown or detects a failure from which it cannot recover, the I/O Module (10) informs (35) the Control Module (9) about that and the Control Module (9) sends a T-DISSOCIATE Request (36) to the Sender's unicast address or multicast address as configured. The Sender responds with a T-DISSOCIATE Confirm (37) to the Receiver's unicast address or multicast address as configured.

Whenever any of the senders or the receivers wants to terminate the association, it sends a T-DISSOCIATE Request (38) i.e. an association termination request to the multicast address and expects the T-DISSOCIATE Confirm (37) from the others to unicast to it. This is also tied to a timer. If the confirm message is not received, it will retry the configured number of times and then close down the session at its end.

Congestion control is implemented by a combination of three mechanisms. The first is the rate control that specifies the maximum rate of data that can be sent from the sender, on a per association basis and a total of all associations. The second is the transmit window that allows the maximum amount of data that the sender can transmit before waiting for an acknowledgement. The third is the receive window sent from each receiver in T-DATA-Response packet as the acknowledgement for data. It is a subset of the configured transmit window. It is dependent upon the system resources at the Receiver. The Round Trip Time (RTT) used by the Sender is a function of the RTTs of the computer nodes in the synchronous part of the pipeline with some overage for the remote computer nodes that are farther away. The type of function can be, but not limited to, maximum, average, mode etc. The flow control is implemented using a combination of congestion control and configured parameters like the transmission window and receive window. These configured parameters are administrative domain specific and is usually but not limited to interface bandwidth, link bandwidth, time of day, network traffic etc.

As is evident from the discussions above, for the replication mechanism of the present invention, the data transfer from sender (17) is required to be reliable only to an aggregate of receivers (18). In other words, the client (1) need not be responsible for transmitting data to all the computer nodes (5) but to an aggregate of computer nodes only. The aggregate of computer nodes can be defined by a policy. The policies can be any one of the following but not limited to:

1) All or None: The client considers the transmission to be successful, only if all the computer nodes in the replication pipeline have received the data.

2) First N: The client considers the transmission to be successful if the first N count of computer nodes in the replication pipeline has received the data.

3) Any N: The client considers the transmission to be successful if any N computer nodes out of all the computer nodes in the replication pipeline have received the data.

4) Synchronous N: The client considers the transmission to be successful if the synchronous N computer nodes out of all the computer nodes in the replication pipeline have received the data.

The aggregate of computer nodes defined by any of such policies collaborate among themselves to ensure that the data is transmitted reliably from the sender (17) to each of the receivers (18) participating in the association. In the present example the protocol is implemented as a state machine for the receiver and a hierarchical state machine for the transmitter or sender. In the case of the transmitter, the hierarchy is of two levels. The lower level corresponds to each receiver. The upper level corresponds to the aggregate of all receivers.

Figure 11:
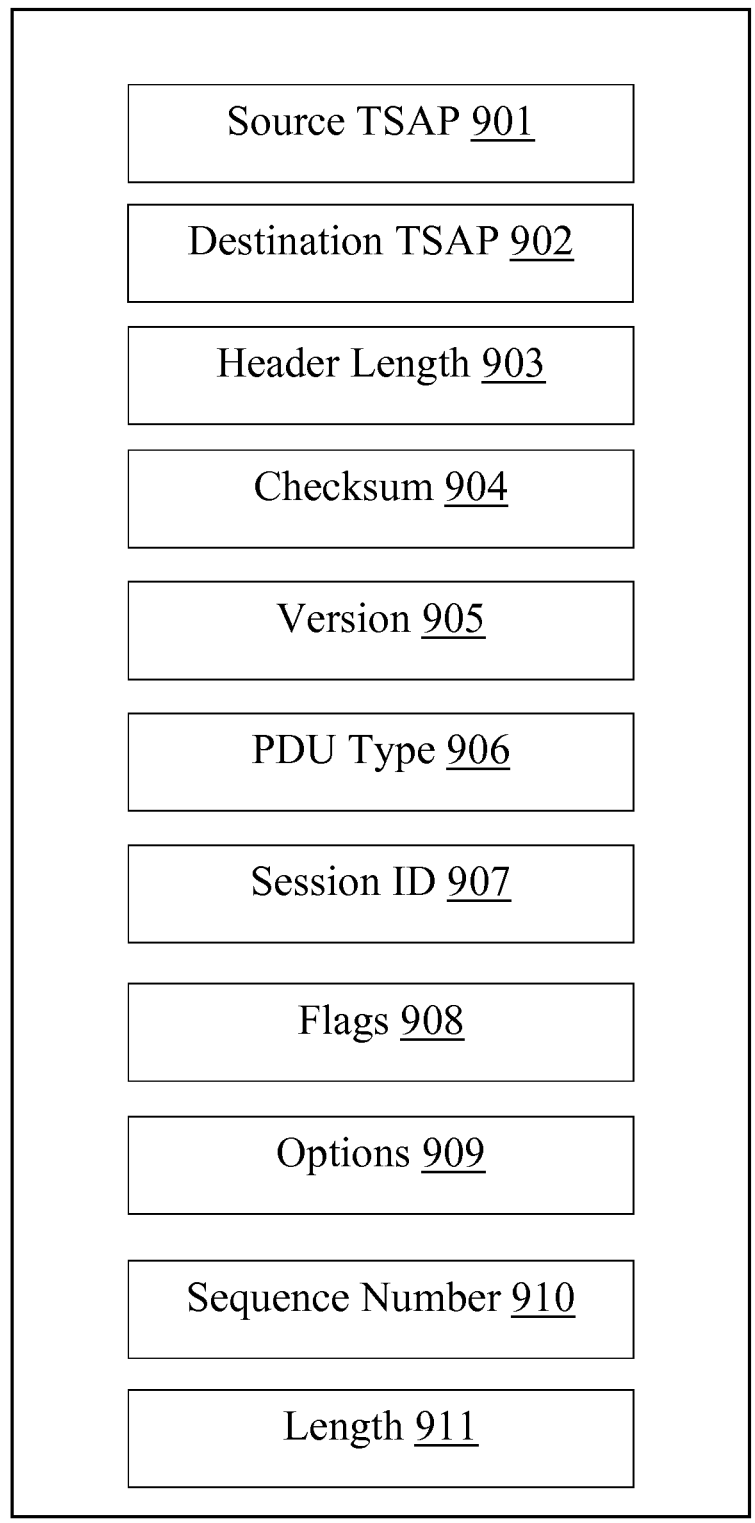
FIG. 11 illustrates the essential elements of the header of the protocol in accordance with an embodiment of the present invention.

FIG. 11 shows the various elements of the header (900), not necessarily in the same order, in the messages of this protocol of the present invention. Some of the elements may be used or not used and with varying sizes. The information of the usage and their sizes are specified in a profile configuration for a specific implementation. The Source TSAP (901) and Destination TSAP (902) are used to multiplex between different users of this protocol. The Header Length (903) refers to the length of the header (900). In the preferred embodiment, the header (900) would of fixed length and would be configured in the profile as mentioned above. In that case, Header Length (903) field will not be present. Other embodiments that have a variable sized header (900) will have the Header Length (903) field. The Checksum (904) would ideally be at least 32 bit length but smaller size can be used. The algorithm for the checksum should be specified in the profile. The Version (905) is the version of the protocol. The PDU Type (906) field specifies the type of packet like Association request or Association response or Data request etc. The Session ID (907) is the one generated for this session. It has to be unique in the network at any point of time. The Flags (908) field carries the various binary valued fields representing the various settings in the protocol. The Options (909) carries the various non-binary valued fields. The Sequence Number (910) field has a context dependent meaning. In the association set up packets, it refers to the initial sequence number. In the data request packets, it refers to the starting sequence number of the data octets in that packet. In the data response packet, it refers to the cumulative sequence number. In the data response solicitation packets, it refers to the largest sequence number of the data octets already transmitted. In the dissociate packets, it refers to the largest sequence number of the data octets already transmitted. In the data repair packets, it refers to the starting sequence of the missing data. The sequence number field wraps to zero and progresses forward every time it has reached the maximum field value. Each iteration of the wrapped sequence number has a position value higher than the sequence number prior to that wrap. The length field (911) specifies the total length of the data portion.

FIG. 12 shows the design of the state machine through a fragment. It demonstrates the incorporation of the aggregation policy. The state machine at State 1 (1001) sends a Request (1002) and starts a timer waiting for Response (1004). The state machine is now in a Wait (1003) state. The timer can also have a retry counter that is reset. If the Response (1004) is received, the machine goes into Evaluate Policy (1006). Depending upon the result of the evaluation, it goes into State 2 (1007) or goes back to Wait (1003) state waiting for further Response(s) (1004). Depending upon the case, it might trigger another Request (1002) and then go into the Wait (1003) state. If the timer expires, it may trigger another request. If the retry count is exhausted, it might have an Exception (1008) situation and go into a State 3 (1009) after evaluating the policy.

Process or method charts is used to describe the steps of the present invention. While the various steps in this process chart are presented and described sequentially, some or all of the steps may be executed in different orders, may be combined or omitted, and some or all of the steps may be executed in parallel. Further, in one or more of the embodiments of the invention, one or more of the steps described above may be omitted, repeated, and/or performed in a different order. In addition, additional steps, omitted in the process chart may be included in performing this method. Accordingly, the specific arrangement of steps shown in FIG. 5 through FIG. 8 should not be construed as limiting the scope of the invention.

What is claimed is:

1. A system for a reliable multicast, said system comprising one or more senders, a plurality of receivers and one or more data system managers running on computers, wherein said one or more senders, said plurality of receivers and said one or more data system managers are communicatively connected through a communication network; and are operable to at least:

transmit a multicast network address information by said one or more data system managers to said one or more senders and to said plurality of receivers;

create, by each sender of said one or more senders, a hierarchical state machine corresponding to a transmission session for a reliable multicast of a plurality of packets of data;

transmit a T-Associate request multicast by said each sender on said multicast network address;

transmit a T-Associate Confirm multicast by each sender of said one or more senders to said plurality of receivers to confirm an association with said plurality of receivers when said each sender receives a T-Associate Response against said T-Associate Request from each of a plurality of synchronous receivers defined for an aggregate of said plurality of receivers as per an aggregation policy;

multicast a T-Data Request by said each sender of said one or more senders to said plurality of receivers for transmitting said plurality of packets of data;

transmit a T-Data Response by each receiver of said plurality of receivers which receives one or more packets of said plurality of packets of data within a pre-configured time;

transmit a negative acknowledgement T-DATA Response by a receiver of said plurality of receivers which detects a gap in receiving a packet of said one or more packets;

retransmit, said packet of said one or more packets by said each sender, if said T-Data Response is not received by said each sender or if said each sender receives said negative acknowledgement T-Data Response;

transmit a repair response packet to said receiver of said plurality of receivers which detects said gap, by a receiver of said plurality of receivers which receives said packet of said one or more packets detected missing in said gap; and transmit a T-Dissociate Request by said each sender to terminate said association when said each sender receives from said aggregate of said plurality of receivers said acknowledgement against receipt of each of said one or more packets of said plurality of packets of data.

2. The system of claim 1, wherein said plurality of synchronous receivers defined for said aggregate of said plurality of receivers include said each receiver of said plurality of receivers as per said aggregation policy.

3. The system of claim 1, wherein said negative acknowledgement T-DATA Response is sent unicast to said each sender if a lower edge of a transmission window created on said hierarchical state machine corresponding to said receiver which detects said gap has not exceeded a beginning of said gap or said negative acknowledgement T-DATA Response is sent multicast if said lower edge has moved past said beginning of said gap.

4. The system of claim 1, wherein a timer in said hierarchical state machine is started after transmitting said T-Associate request multicast and also after multicasting said T-Data Request.

5. The system of claim 4, wherein said retransmitting said packet of said one or more packets by said each sender is done until a number of count configured in said timer gets exhausted.

6. The system of claim 1, wherein a congestion control is implemented in said reliable multicast through a combination of a plurality of mechanisms.

7. The system of claim 6, wherein said plurality of mechanisms include a rate control that specifies a maximum rate for said multicasting said plurality of packets of data that can be sent from said each sender on a per said association basis and a total of all said associations.

8. The system of claim 6, wherein said plurality of mechanisms include a receive window sent from said each receiver of said plurality of receivers in said T-Data Response sent against receipt of said one or more packets of data.

9. The system of claim 1, wherein, after transmitting said repair response packet to said receiver of said plurality of receivers which detects said gap, said receiver of said plurality of receivers which receives said packet of said one or more packets detected missing in said gap multicasts a repair report as per said multicast network address.

10. A method of providing a reliable and efficient multicast data transfer mechanism in a communication network, said method comprising the steps of:

multicasting, by one or more senders, an association request message as per a multicast network address to a plurality of receivers for a reliable multicast of a plurality of packets of data, wherein said one or more senders and said plurality of receivers are communicatively connected with each other over said communication network;

multicasting, by each sender of said one or more senders, an association confirmation message as per said multicast network address to confirm an association with said plurality of receivers when said each sender receives an association response against said association request message from each of a plurality of synchronous receivers defined for an aggregate of said plurality of receivers as per an aggregation policy;

multicasting, by said each sender, said plurality of packets of data;

transmitting an acknowledgement by each receiver of said plurality of receivers which receives one or more packets of said plurality of packets of data within a ore-configured time;

transmitting a negative acknowledgement by a receiver of said plurality of receivers which detects a gap in receiving a packet of said one or more packets;

retransmitting, said packet of said one or more packets by said each sender, if said acknowledgement is not received by said each sender or if said each sender receives said negative acknowledgement;

transmitting, a repair response packet to said receiver of said plurality of receivers which detects said gap, by a receiver of said plurality of receivers which receives said packet of said one or more packets detected missing in said gap; and concluding, by said each sender, said reliable multicast of said plurality of packets of data to be successful when said each sender receives said acknowledgement against receipt of each of said one or more packets of said plurality of packets of data by said aggregate of said plurality of receivers.

11. The method of claim 10, wherein an address allocator module included in one or more data system managers generates one or more encryption keys which are distributed with said multicast network address to make said multicasting of said plurality of packets of data encrypted.

12. The method of claim 10, wherein said plurality of synchronous receivers defined for said aggregate of said plurality of receivers include said each receiver of said plurality of receivers as per said aggregation policy.

13. The method of claim 10, wherein a hierarchical state machine corresponding to a transmission session is created by said each sender for said reliable multicast of said plurality of packets of data.

14. The method of claim 13, wherein a lower level of said hierarchical state machine is created corresponding to said each receiver of said plurality of receivers.

15. The method of claim 13, wherein an upper level of said hierarchical state machine is created corresponding to said aggregate of said plurality of receivers.

16. The method of claim 13, wherein a timer in said hierarchical state machine is started after said multicasting of said association request message and also after said multicasting of said plurality of packets of data.

17. The method of claim 16, wherein said retransmitting said packet of said one or more packets by said each sender is done until a number of count configured in said timer gets exhausted.

18. The method of claim 13, wherein said negative acknowledgement is sent unicast to said each sender if a lower edge of a transmission window created on said hierarchical state machine corresponding to said receiver of said plurality of receivers which detects said gap has not exceeded a beginning of said gap or said negative acknowledgement is sent multicast if said lower edge has moved past said beginning of said gap.

19. The method of claim 10, wherein a congestion control is implemented in said reliable multicast through a combination of a plurality of mechanisms.

20. The method of claim 19, wherein said plurality of mechanisms include a rate control that specifies a maximum rate for said multicasting said plurality of packets of data that can be sent from said each sender on a per said association basis and a total of all said associations.

21. The method of claim 19, wherein said plurality of mechanisms include a receive window sent from said each receiver of said plurality of receivers in said acknowledgement sent against receipt of said one or more packets of data.

22. The method of claim 10, wherein after transmitting said repair response packet to said receiver which detects said gap, said receiver of said plurality of receivers which receives said packet of said one or more packets detected missing in said gap multicasts a repair report as per said multicast network address.

23. The method of claim 10, wherein each of said association request message, said association response, said association confirmation message, said plurality of packets of data multicast by said each sender, said acknowledgement, said negative acknowledgement and said repair response packet is identifiable by a sequence number specified in a sequence number field included in a header.

24. The method of claim 23, wherein in said association request message, in said association response and in said association confirmation message said sequence number specifies an initial sequence number of said plurality of packets.

25. The method of claim 23, wherein in said each packet of said plurality of packets of data multicast by said each sender said sequence number specifies a starting sequence number of data octets included in said each packet.

26. The method of claim 23, wherein in said acknowledgement said sequence number specifies a cumulative sequence number for said one or more packets received.

* * * * *